(No Model.)

E. P. LYNCH.
HARROW.

No. 258,782. Patented May 30, 1882.

Attest:
Sidney P. Hollingsworth
Harry Shipley

Inventor.
Edward P. Lynch
By his Atty
Philip T. Dodge ptu
UNITED STATES PATENT OFFICE.

EDWARD P. LYNCH, OF DAVENPORT, IOWA.

HARROW.

SPECIFICATION forming part of Letters Patent No. 258,782, dated May 30, 1882.

Application filed March 3, 1882. (No model.)

*To all whom it may concern:*

Be it known that I, EDWARD P. LYNCH, of Davenport, in the county of Scott and State of Iowa, have invented certain Improvements in Harrows, of which the following is a specification.

My invention relates to that class of harrows in which a number of independent harrow frames or sections are arranged side by side and jointed at the front ends to a draft-bar or other draft device. These harrows are commonly provided with teeth, which are pivoted or inclined, so that their action may be changed by drawing the harrow with one or the other of the ends forward, as required. When drawn in one direction the harrow offers much greater resistance than when drawn in the other, and consequently the number of frames must be reduced.

My invention is designed to permit two, three, or four or more harrow sections or frames to be used with the same draft devices, and to maintain the frames in proper position and prevent them from swaying laterally when in action.

To this end the invention consists in a peculiar arrangement and construction of the draft-bars, and in a peculiar coupling device, hereinafter explained in detail.

Figure 1:
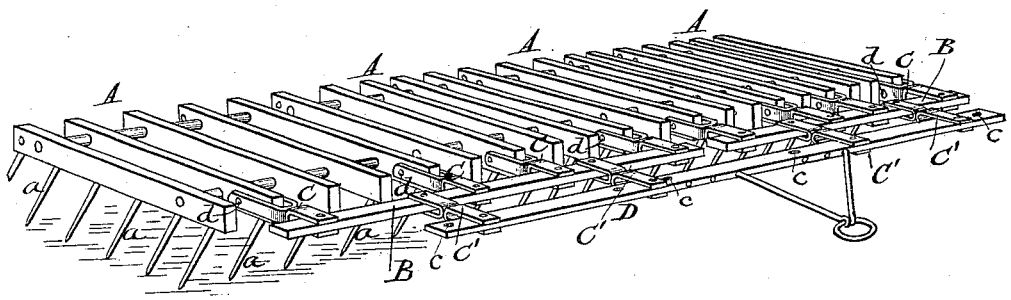
Figure 2:
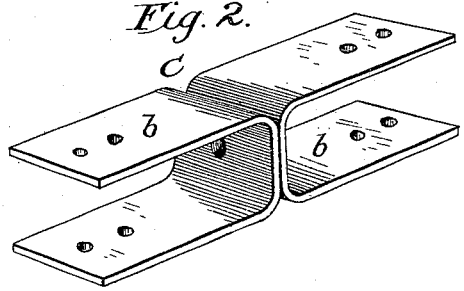
Figure 3:
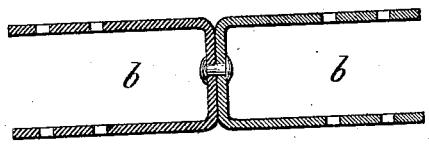

Referring to the accompanying drawings, Figure 1 represents a top plan view of my improved harrow with four sections or frames. Fig. 2 is a perspective view of the coupling; Fig. 3, a longitudinal section through the center of the same.

A A represent the harrow frames or sections, which may be made of any ordinary or approved form, those represented in the drawings consisting each of longitudinal bars connected by transverse bars or rods and provided with the series of harrow-teeth *a*.

B B represent two short draft-bars, denominated for convenience "secondary" bars, each designed to draw two of the harrow-sections. The bars B are arranged end to end in advance of the frames A and each bar connected to two frames. The connection between each frame and the corresponding bar is made by two couplings, C, such as represented in detail in Figs. 2 and 3. These couplings consist each of two U-shaped jaws or clevises, *b*, having their rear ends united by a horizontal pivot-pin or equivalent swiveling connection. Each coupling has its rear end united by a horizontal pin, *d*, to the harrow beam or bar and its forward end connected by a vertical pin to the draft-bar B. These connections permit the harrow-frames to adjust themselves independently to the surface of the ground, but prevent them from swinging sidewise, an evil which interferes materially with the proper action of many harrows in use. The secondary draft-bars B are connected with and drawn by the main draft-bar D, lying in front and united with each of the secondary bars by two coupling links, chains, or other devices, C', which may be of any suitable form, although they are preferably of the form represented in Figs. 2 and 3.

As represented, the harrow contains four sections. In order to admit of its being readily and without additional parts converted into a harrow of three sections, the main draft-bar D is made of suitable length and provided with holes *c*, so spaced as to permit the couplings C of three frames, A, to be connected directly to said main bar, the secondary bars B being in such case first disconnected and removed. If still smaller harrows are required, the main draft-bar D is disconnected, when the other parts are arranged as in Fig. 1, thereby leaving two harrows of two sections each.

When the harrows are provided with inclined or reversible teeth, as first mentioned, each frame A will be perforated at both ends to receive the couplings, so that the frame may be drawn either end first.

While it is preferred to make use of the coupling device herein shown, it is manifest that the bars constructed and arranged to interchange as described may be used with other couplings.

I am aware that a combined swiveling and sliding connection has been devised for uniting the harrow frames or sections with each other, the device embracing two plates pivoted together and combined with a third plate, and a sliding rod connecting said third plate with one of the others. The device, however, was not adapted for practical use in connecting the draft-bars to the front of the harrow-frames, nor were the pivoted jaws adapted to be conected by pivots directly with the draft-bar and harrow-frame, as in my device. In short, the two devices are widely dissimilar in contruction, mode of operation, and mode of attachment.

I am also aware that a series of harrow-frames, arranged side by side and coupled directly to each other, have been connected with the main draft-bar by means of intermediate bars, the arrangement being such, however, that each harrow-frame was drawn by means of a single connection at its forward end. It will be observed that under my construction each harrow-frame is drawn by two connections at the forward end.

Having thus described my invention, what I claim is—

1. The coupling for connecting a harrow-frame with a draft-bar, the same consisting of two U-shaped jaws adapted to embrace the harrow-frame and the draft-bar, respectively, and united at their closed ends by a swiveling connection.

2. The coupling for connecting a harrow with a draft-bar, consisting solely of two U-shaped heads or jaws extended in opposite directions and united by a swivel connection, substantially as shown, each jaw having its arms provided with a hole to receive a pivot-pin.

3. The combination of the independent harrow-frames A, the secondary draft-bars B, two connections, substantially as shown, between each harrow-frame and the corresponding draft-bar, and the main draft-bar D, connected with the secondary bars, as shown.

4. As an improvement in convertible sectional harrows, the frame A, secondary bars B, coupling C C', and the main draft-bar D, adapted, as described, for connection with the harrow-frames A or with the secondary bar B at will, whereby the one draft-bar is adapted for use with any required number of sections, substantially as and for the purpose set forth.

5. In a convertible harrow, the combination of the main draft-bar D, two or more secondary draft-bars, B, harrow frames or sections A, and connecting devices C, said parts constructed, substantially as described and shown, to permit the frame-sections to be connected to the main draft-bar or to the secondary draft-bars at will, substantially as and for the purpose described.

EDWARD P. LYNCH.

Witnesses:
NATH. FRENCH.
GEO. W. FRENCH.